United States Patent
Renntoft

(10) Patent No.: US 7,250,924 B2
(45) Date of Patent: Jul. 31, 2007

(54) DEVICE A USE AND A METHOD FOR TRACER STREAM SIMULATION

(75) Inventor: Per Renntoft, Skillingaryd (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 10/451,198

(22) PCT Filed: Dec. 14, 2001

(86) PCT No.: PCT/SE01/02776

§ 371 (c)(1),
(2), (4) Date: Jun. 19, 2003

(87) PCT Pub. No.: WO02/052218

PCT Pub. Date: Jul. 4, 2002

(65) Prior Publication Data

US 2004/0068912 A1    Apr. 15, 2004

(30) Foreign Application Priority Data

Dec. 21, 2000    (SE)    ..................... 0004753

(51) Int. Cl.
G02B 23/18    (2006.01)
(52) U.S. Cl. .......................... 345/8; 359/407
(58) Field of Classification Search .................. 42/118; 345/7, 8; 359/407
See application file for complete search history.

(56) References Cited

U.S. PATENT DOCUMENTS

| 3,974,585 | A |   | 8/1976  | Dunham ..................... 33/241 |
| 4,805,988 | A | * | 2/1989  | Dones ........................ 359/471 |
| 5,572,229 | A | * | 11/1996 | Fisher ........................... 345/8 |
| 5,696,521 | A | * | 12/1997 | Robinson et al. ............. 345/8 |
| 6,040,945 | A | * | 3/2000  | Karasawa .................... 359/630 |
| 6,236,502 | B1 | * | 5/2001 | Kitajima ..................... 359/389 |
| 6,487,012 | B1 | * | 11/2002 | Khoshnevis et al. ........ 359/407 |

FOREIGN PATENT DOCUMENTS

DE    40 04 077 C1    6/1991
EP    0 718 585 A1    6/1996

\* cited by examiner

*Primary Examiner*—Stephen M. Johnson
(74) *Attorney, Agent, or Firm*—Carter, DeLuca, Farrell & Schmidt, LLP

(57) ABSTRACT

A device for tracer stream simulation is disclosed. The device includes a casing having an aperture, a beam splitter, and structure for generating a first image. The aperture is capable of displaying first and second fields of sight. The beam splitter conveys a second image to the first and second fields of sight while superposing the first and second images in the first field of sight. A system for tracer stream simulation is also disclosed and includes a biocular sight with the device being adapted for attachment to the biocular sight. A method for tracer stream simulation in a biocular sight is also disclosed.

10 Claims, 2 Drawing Sheets

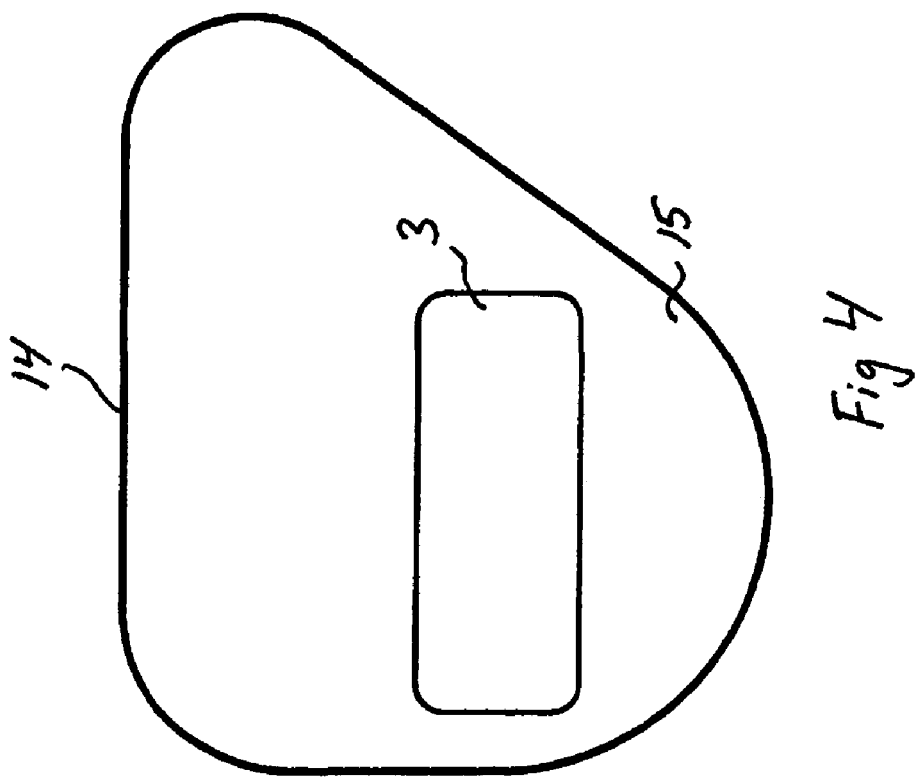
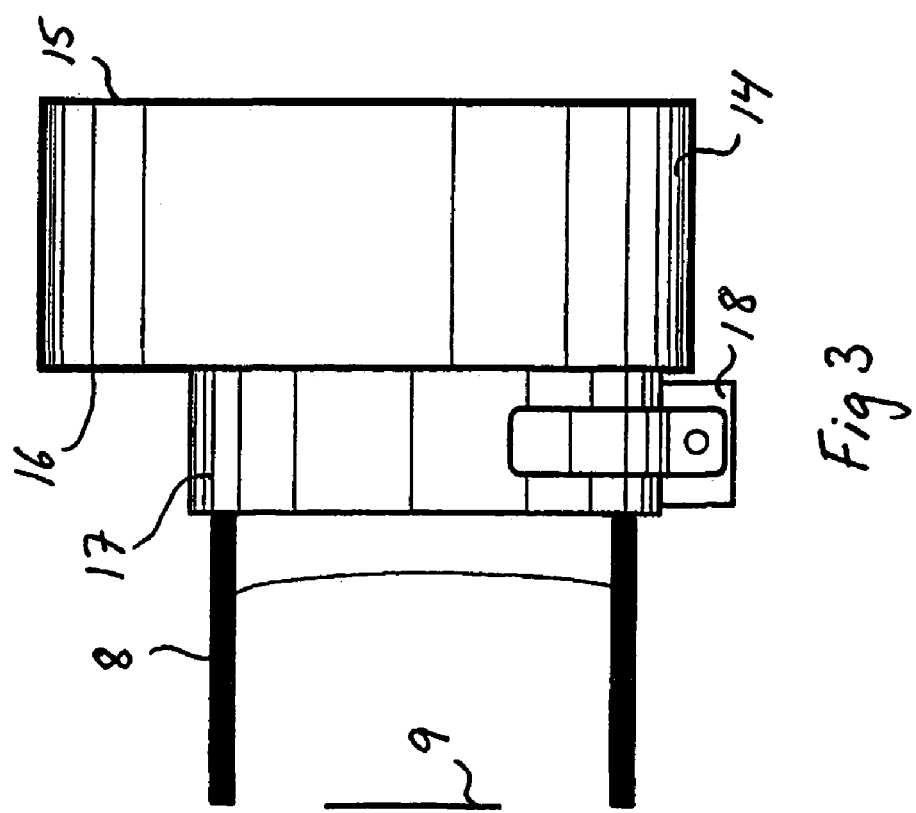

DEVICE A USE AND A METHOD FOR TRACER STREAM SIMULATION

CROSS REFERENCE TO RELATED APPLICATIONS

This application claims priority from and the benefits of the PCT publication number WO 02/052218 A1 filed on Dec. 14, 2001 and published on Jul. 4, 2002.

FIELD OF THE INVENTION AND PRIOR ART

The present invention relates to a device and a method for tracer stream simulation in a biocular sight. The invention is particularly intended to be used for tracer stream simulation in a biocular sight in a weapon system, such as for instance a tank.

A laser unit, which is mounted to the barrel and emits a laser beam in the pointing direction of the barrel when firing takes place, is often used in simulated firing. In this type of simulated firing, it is often desirable to present for the marksman a simulated tracer stream representing the calculated trajectory of a simulated projectile fired from the weapon. In those cases where the marksman in the aiming of the barrel of the weapon is using a monocular sight, where the focusing is carried out on the infinity and with one eye, an image comprising a simulated tracer stream can without any major problems be superposed on the normal image conveyed by the sight. A unit reflecting the tracer stream image into the sight via a beam splitter arranged in front of or behind the sight is normally used in this connection. In those cases where the sight is biocular and either of thermal type or of a type where the image from the surroundings is directed into the sight via a stabilised main mirror, i.e. of the type of sight often used in a tank, problems do however arise. With those types of sights, the image with the simulated tracer stream can not be reflected into the sight from a beam splitter arranged in front of the sight, i.e. at the end opposite the ocular.

A solution that has been tried for tracer stream simulation at said type of biocular sights has been to project an image comprising simulated tracer stream via a beam splitter arranged in front of the ocular of the sight. In this case, the image comprising the tracer stream has been projected into both of the eyes of the person looking into the sight via two separate ray paths, i.e. via a first ray path for the right eye and a second ray path for the left eye. With this solution, problems with double image of the tracer stream will however arise, since the distortion of the image in the lens system of the biocular sight is relatively high.

To make it possible to look into a biocular sight with both eyes in a comfortable manner, these are normally manufactured with an exit aperture having a diameter in the order of 80 mm. When applying the above-mentioned solution, the unit comprising the beam splitter and the other components required for the tracer stream simulation will become unwieldy large when the unit is to be adapted for tracer stream simulation at a binocular sight with an exit aperture of said size.

The alternative solution one has been reduced to using till now for tracer stream simulation at biocular sights of the mentioned type with relatively large exit aperture has been to record the sight image with tracer stream appearing thereon. The image is then shown on a monitor mounted at the side of the sight. This solution is costly. Furthermore, this solution implies that the person using the sight is not looking into the sight itself, but is viewing the sight image via the monitor, which reduces the realism in the training and causes problems with resolution and contrast.

Consequently, there is a need for a more appropriate solution for simulation of tracer stream at biocular sights of the abovementioned type.

In this description and the subsequent claims, the term biocular sight refers to a sight which it is intended to look into with both eyes simultaneously via one and the same exit aperture. Consequently, a biocular sight comprises optical elements being common for both eyes.

OBJECT OF THE INVENTION

The object of the present invention is to achieve a device for tracer stream simulation at a biocular sight, by means of which device an image comprising simulated tracer stream in a simple and efficient manner can be superposed on the sight image conveyed by the sight.

SUMMARY OF THE INVENTION

According to the invention, said object is achieved by means of a device for image simulation having a casing with an aperture and a beam splitter. The device includes structure for generating a first image where the first image preferably includes a simulated tracer stream from a projectile. The structure for generating the first image may include a cathode ray tube (CRT) or a liquid crystal display (LCD). The aperture is located on one wall of the casing and is configured and dimensioned for displaying first and second fields of sight. The beam splitter optically couples the structure for generating the first image and the aperture. A second image is conveyed to the beam splitter and is optically coupled to the aperture where it is viewable in both first and second fields of sight. In a preferred embodiment, the beam splitter superposes, or combines, the first image and the second image in one of the fields of sight while only the second image is viewable in the other field of sight. The first image may be generated in an image plane that is outside the fields of view of a person looking into the aperture.

Additionally, the inventive device for image simulation may be combined into a system including a biocular sight. In this embodiment, the device for image simulation is configured and adapted for placement on a biocular sight. Preferably, the device for image simulation is attachable to an exit aperture of the biocular sight and may be releasably attached to the biocular sight.

The inventive solution implies that the simulated tracer stream is only projected into one of the eyes of a person looking into the sight provided with the device. During the decades when a solution of the problem in question with tracer stream simulation at biocular sights has been searched for, there has all the time been an aspire to achieve a projection of the simulated tracer stream into both eyes of a person looking into the sight. Consequently, the solution according to the invention constitutes a new approach going in the opposite direction to the prevailing development within this technical field. With the inventive solution a number of advantages are obtained. Inter alia, the risk that a person looking into the sight will see a double image of the simulated tracer stream is completely eliminated. Furthermore, the diameter of the exit aperture will be about the half when projecting into one eye as compared with projecting into both eyes. This implies that the linear dimensions of the tracer stream generator can be reduced to the half and the volume is thereby reduced to an eighth. The invention can for instance be made small enough for making it possible to mount the device at a biocular sight in a combat vehicle, such as a tank, where the space normally is very limited.

The invention also relates to a method for image simulation where a first image is projected into first and second fields of sight. A second image is generated that includes a simulated tracer stream from a projectile. The second image is projected into the second field of sight and a beam splitter superposes, or combines, the first and second images in the second field of sight. The second image may be generated by a CRT or an LCD.

Preferred embodiments of the invention will appear from the claims and the subsequent description.

BRIEF DESCRIPTION OF THE DRAWING

The invention will in the following be more closely described by means of embodiment examples with reference to the appended drawing. It is shown in:

FIG. 3 a sectional view of a device according to an embodiment of the invention mounted in front of a biocular sight; and FIG. 4 the device according to FIG. 3 as seen from the front.

DETAILED DESCRIPTION OF PREFERRED EMBODIMENTS OF THE INVENTION

Figure 1:
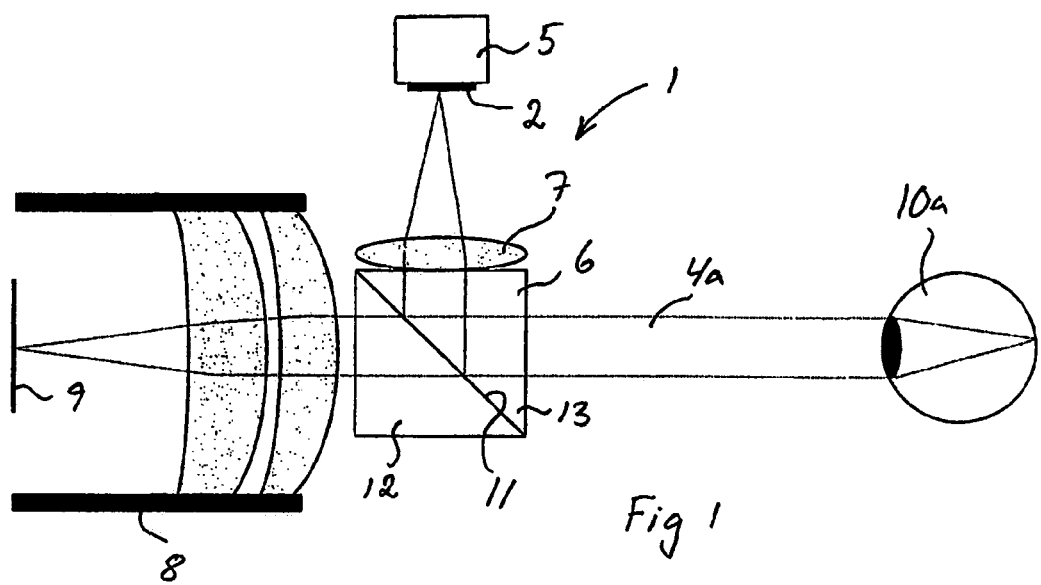
FIG. 1 a schematical illustration of a device according to the invention as seen from the side.

FIG. 1 illustrates very schematically the construction of a device according to the invention as seen from the side. The device 1 comprises means for generation in an image plane 2 of an image comprising a simulated tracer stream from a projectile, this image plane 2 being located at the side of an aperture 3 (see FIG. 4) included in the device, so that the image plane 2 does not lie directly in the field of view 4a, 4b of a person looking through the device via said aperture 3. Said means preferably includes of a cathode ray tube, schematically indicated at 5 in FIG. 1, in which case the image plane of the cathode ray tube consequently constitutes the image plane 2. Said means can for instance also include of a LCD-display of reflecting or transmitting type or of a light emitting diode array.

Figure 2:
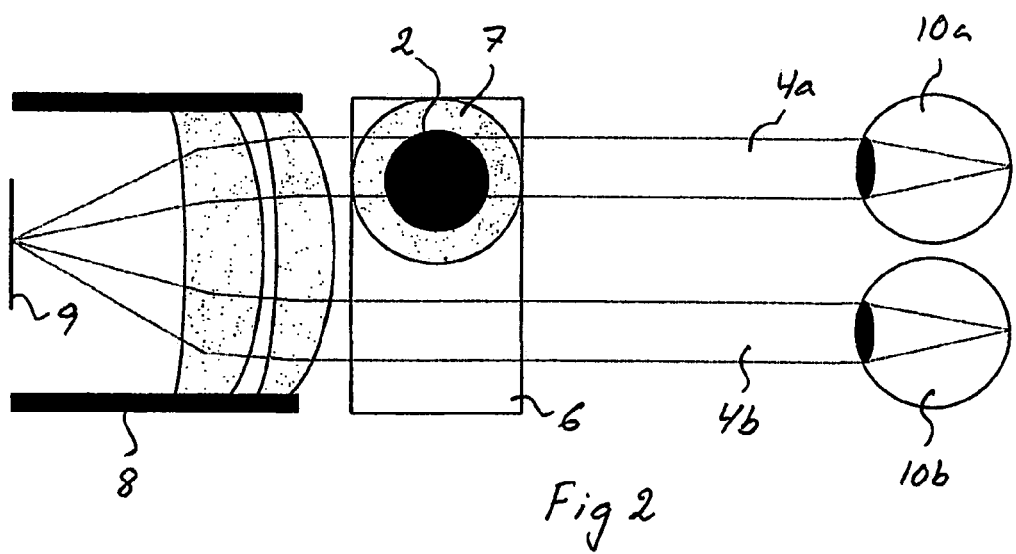
FIG. 2 a schematical illustration of a device according to the invention as seen from above.

The device further comprises a beam splitter 6 arranged to project the tracer stream image generated in the image plane 2 into one 10a of the eyes of a person looking through the device via said aperture 3. An ocular 7 is arranged between the beam splitter 6 and the image plane 2. The device 1 is intended to be placed in front of a biocular sight, schematically indicated at 8 in FIGS. 1-3, so that a person looking into the sight 8 in one 10a of his eyes (the right one in FIG. 2) will see an image generated in the image plane 9 of the sight with the image, comprising the simulated tracer stream, generated in the image plane 2 of the device superposed, and in his other eye 10b (the left one in FIG. 2) will see the image generated in the image plane 9 of the sight without any image comprising simulated tracer stream superposed. In FIG. 2 it is clearly illustrated how the tracer stream image generated in the image plane 2 of the device only is projected via the beam splitter 6 into one of the eyes of a person looking into the sight.

In the embodiment shown in FIG. 2, the beam splitter 6 has such an extension that it covers the fields of sight 4a, 4b for both eyes 10a, 10b of a person looking into the sight 8.

As the beam splitter 6 only is arranged to project the tracer stream image into one of the eyes, it is however sufficient that the beam splitter 6 has such an extension that it only covers the field of sight 4a for one of the eyes of a person looking into the sight 8.

The beam splitter 6 comprises a semi-transparent mirror 11, which is arranged to reflect rays of light from the image generated in the image plane 2 of the device and thereby project this image into one 10a of the eyes of a person looking into the sight 8. The semi-transparent mirror 11 is further arranged to allow rays of light from the image generated in the image plane 9 of the sight to pass through. In the embodiment shown in FIGS. 1 and 2, the beam splitter 6 comprises two pieces of glass 12, 13 with triangular cross-sectional shape, which are joined together by means of gluing so as to jointly form an element with rectangular cross-sectional shape. A mirror coating 11 is arranged in the joint between the pieces of glass 12, 13. The mirror coating 11 can either include a separate layer-shaped element or be integrated with one of the pieces of glass. Other designs of the beam splitter 6 besides the one described above are of course also possible. The principal thing is that the beam splitter will function as a semi-transparent mirror in the above-indicated manner.

FIG. 3 shows an inventional device 1 mounted in front of the exit aperture of a biocular sight 8, preferably a biocular sight in a tank. In the embodiment shown in FIG. 3, the device 1 comprises a casing 14 enclosing the means 5 for generation of the tracer stream image, the ocular 7 and the beam splitter 6. An aperture 3 is arranged at a front wall 15 of the casing, through which aperture a person looking into the sight is intended to direct his eyes. This aperture 3 can with advantage be rectangular and can for instance have a size of about 35×80 mm. This shape and size of the aperture 3 is sufficient for allowing a person to look comfortably into the sight via the aperture 3 with both eyes. Owing to that the aperture 3 of the device has a smaller extension than the exit aperture of the sight, which as previously mentioned normally has a diameter in the order of 80 mm, a part of the space directly in front of the exit aperture of the sight can be used for accommodating the components included in the device 1, whereby the device 1 can be made more compact and space-saving. At the rear wall 16 of the casing, a not shown aperture is arranged, which aperture has essentially the same shape and size as the aperture 3 at the front wall 15 of the casing and which is arranged coaxially with this aperture. The device according to the embodiment shown in FIG. 3 further comprises a tube-shaped holding member 17, which is connected to the casing 14 and protrudes from the rear wall 16 of the casing. The tube-shaped holding member 17 has an inner diameter which is somewhat larger than the outer diameter of the sight, at the front end of the sight, so that the device 1 can be attached to the sight 8 by applying the holding member 17 so that it encloses the front part of the sight 8. A quick-action fastener 18, which is attached to the holding member 17, is adapted to secure the device 1 to the sight 8.

The means 5 for generation of simulated tracer stream included in the device 1 is suitably supplied with electric current from a separate current source placed at a distance from the device, in which case the device 1 is provided with a not shown connection for connecting up of current from said current source to said means 5.

The means 5 for generation of simulated tracer stream is via a not shown connection connectable to a computer unit, which preferably is arranged in a separate unit placed at a distance from the inventional device. Said means 5 can of course also be connected to the computer unit via a wireless connection. This computer unit is adapted to control the tracer stream generation in dependence on given parameters and the aiming of the marksman of a weapon unit associated with the sight so that the simulated tracer light represents the tracer light from a simulated projectile fired from said weapon unit. The device according to the invention is particularly intended to be used for tracer stream simulation at a biocular sight in a weapon system, such as a tank, in which case the simulated tracer stream is intended to represent the tracer stream from a simulated projectile fired by means of a weapon unit of the weapon system.

The invention is of course not in any way limited to the preferred embodiments described above, on the contrary several possibilities to modifications thereof should be apparent to a person skilled in the art without therefore deviating from the basic idea of the invention as defined in the appended claims.

What is claimed is:

1. A system for image simulation comprising:
   a biocular sight having an exit aperture, the biocular sight optically coupling a first image and the exit aperture;
   a casing adapted for attachment to the biocular sight;
   an aperture located on a wall of the casing, the aperture configured for displaying first and second fields of sight;
   a means for generating a second image being adapted to fit within the casing, the second image including a simulated tracer stream from a projectile; and
   a beam splitter adapted to fit within the casing, the beam splitter optically coupling the means for generating, the exit aperture, and the aperture, wherein the beam splitter directs the second image directly from the means for generating a second image into the first field of sight to form a superposed image, the beam splitter optically coupling the superposed image and the first field of sight and optically coupling the first image to the second field of sight, such that the second image is viewable only in the first field of sight and the first image is viewable in both the first and second fields of sight.

2. The system according to claim 1, when the casing is mounted to an exit aperture of the biocular sight.

3. The system according to claim 1, wherein the casing is adapted for releasable attachment to the biocular sight.

4. The system according to claim 1, wherein the means for generating the second image includes a CRT.

5. The system according to claim 1, wherein the means for generating the second image includes an LCD.

6. The system according to claim 1, wherein the beam splitter includes a semi-transparent mirror.

7. The system according to claim 1, wherein the beam splitter includes two joined pieces of glass and a semi-transparent mirror coating placed between the two pieces of glass.

8. The system according to claim 1, wherein the device includes an ocular positioned between a first image plane and the beam splitter.

9. The system according to claim 8, wherein the first image is generated in an image plane located outside the field of sight of a person looking into the aperture.

10. The system according to claim 1, wherein the second image is partially transmitted through the beam splitter from the means for generating a second image before being reflected directly into the second field of site.

* * * * *